Figure 1:
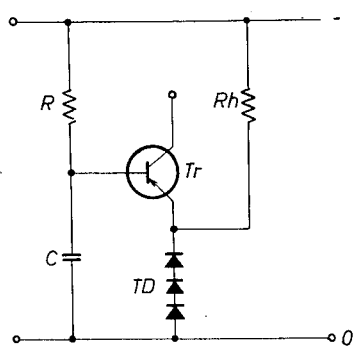

Aug. 17, 1965          F. ULRICH          3,201,610

BASIC CIRCUIT COMPRISING A CHAIN OF TUNNEL DIODES

Filed Jan. 23, 1963

INVENTOR.
FRIEDRICH ULRICH
BY
ATTORNEY

3,201,610
BASIC CIRCUIT COMPRISING A CHAIN OF
TUNNEL DIODES
Friedrich Ulrich, Stuttgart-Bad Cannstatt, Germany,
assignor to International Standard Electric Corporation, New York, N.Y., a corporation of Delaware
Filed Jan. 23, 1963, Ser. No. 253,406
Claims priority, application Germany, Feb. 3, 1962,
St 18,822
7 Claims. (Cl. 307—88.5)

The present invention relates to a basic circuit comprising a chain of tunnel diodes having different peak current characteristics, upon which there is impressed a common basic current which is greater than the greatest valley current, and smaller than the smallest peak current of all tunnel diodes arranged within the chain.

As is well-known, the tunnel diode, within a certain range of the current-voltage characteristic, has a partial area in which, at a given current, the tunnel diode is capable of assuming two different operating points. These two operating points are characterised by a different voltage drop across the diode. This property of the tunnel diode has been utilized in various arrangements for the storing of signals. Arrangements have also been proposed already, which have a multistable behaviour. Such types of arrangements comprise a chain of tunnel diodes as the storage element, having different peak currents. The chain of tunnel diodes, however, cannot be used, without further ado, for the establishment of a multistable arrangement. In order to enable an unobjectionable setting and interrogation of the tunnel diodes, it is necessary to provide corresponding auxiliary circuits which are either tube- or transistor-operated, and which are adapted to safeguard that the voltage pulses appearing during the transition of the tunnel diodes from the one to the other condition or state, are fed to the input or output circuit for the control purpose. As is recognizable from the proposed arrangements, mostly monostable or bistable transistor circuits are necessary to this end. Above all this is dependent upon whether a multistable storage arrangement, a pulse generator with a predetermined number of pulses, a pulse-width converter, an analog-to-digital converter, or a maximum value indicator is supposed to be realized therewith.

It is one object of the present invention to provide a basic circuit comprising a chain of tunnel diodes which is less expensive than the hitherto proposed arrangements, and which can also be used for various of the previously mentioned cases of practical application without necessitating any considerable alterations. This basic circuit which comprises a chain of tunnel diodes whose peak currents have different values, and upon which there is impressed a common basic current which is greater than the greatest valley current, and smaller than the smallest peak current of all tunnel diodes arranged in the chain, is characterised by the fact that in series with the chain of tunnel diodes there is connected the emitter-collector path of a transistor, that upon application of a voltage to this series connection there is initiated an increased current flow passing through the chain of tunnel diodes, that upon each reversal of a tunnel diode from the state of the high voltage drop, the transistor is changed to the blocked (or: non-conducting) state, and that after a certain period of time which is determined by a time-delay element arranged within the control circuit of the transistor, the transistor each time becomes unblocked (or: conductive) again, until all of the tunnel diodes have reassumed the respective state of high voltage drop. If, in accordance with an appropriate embodiment of the inventive type of basic circuit, the time delay of the time-delay circuit is dimensioned greater than the duration of the pulses which are directly applied to the series connection, then the arrangement will operate as a multistable storage device. If the series connection consisting of a transistor path and of the chain of tunnel diodes, is applied to voltage via both an additional resistor and a contact, then the arrangement, upon closing of the contact, will transmit a number of pulses corresponding to the number of tunnel diodes. According to a further embodiment of the inventive type of basic circuit the chain of tunnel diodes is capable of being adjusted, via auxiliary circuits, to a random circuit condition. This arrangement is capable of being used in the most simple manner as a code converter. The (1-out-of-X)-information which is supplied via the auxiliary circuits, may be converted into a corresponding number of pulses upon completion of the main circuit comprising both the transistor and the chain of tunnel diodes. If the inventive type of basic circuit is inserted in a measuring circuit, and if the peak currents of the tunnel diodes are adapted to the current range of the measuring circuit, then an analog-to-digital converter will be available in the most simple way.

Thus, the basic circuit according to the invention not only offers the advantage of being inexpensive, but may also be used for the most various kinds of practical application without requiring any alterations. Quite depending on the use of the basic circuit it is merely necessary to select a corresponding way of control.

Figure 2:
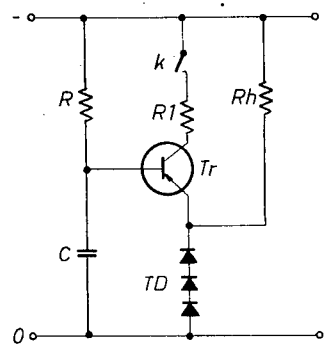
Figure 3:
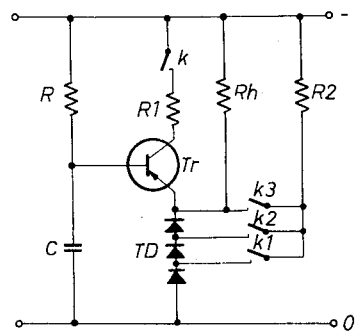
Figure 4:
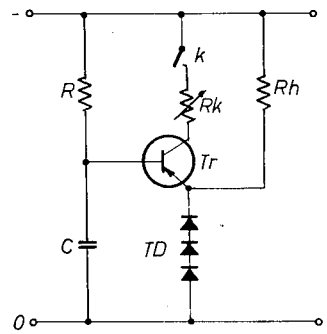
Figure 6:
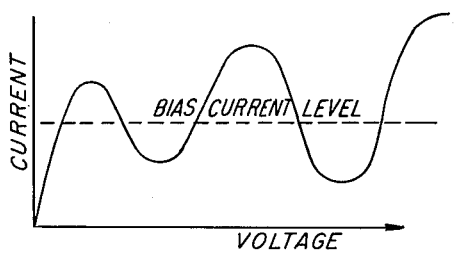
Figure 5:
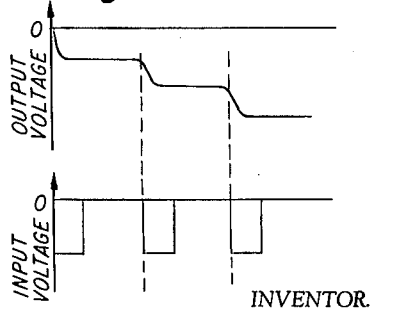

The basic circuit and various kinds of practical applications thereof will now be explained with reference to FIGS. 1 to 4 of the accompanying drawings, in which:

FIG. 1 shows a multistable storage device,
FIG. 2 shows a pulse generator,
FIG. 3 shows a code converter, and
FIG. 4 shows an analog-to-digital converter, and
FIG. 5 shows typical input and output waveforms for the circuit of FIG. 1, and
FIG. 6 shows the current-vs.-voltage characteristic of a typical series chain of tunnel diodes.

Referring to FIG. 1 there is shown the basic circuit according to the invention. The basic current is impressed upon the chain of tunnel diodes TD via the bias current resistor $Rh$. In order to obtain the multistable behaviour of this basic element, the current must be chosen to be greater than the greatest valley current, and smaller than the smallest peak current of all tunnel diodes arranged within the chain. In series with the chain of tunnel diodes there is connected the emitter-collector path of the transistor $Tr$. The transistor is retained in its unblocked state via the resistor R within the base circuit. When applying to the collector of the transistor $Tr$ a negative pulse with a flattened leading edge, as may be produced, e.g., with the aid of relaxation or trigger circuits, then the current passing through the chain of tunnel diodes TD will increase. A plot of the current-vs.-voltage characteristic for such a chain of tunnel diodes is shown in FIG. 6. As soon as the current in this circuit exceeds the value of the peak current of one tunnel diode, this tunnel diode will jerkily assume the other operating point with the high voltage drop. The potential applied to the emitter of the transistor T*r* likewise increases jerkily, with the emitter becoming more negative than the base electrode at which the potential is still maintained for a certain period of time by the capacitor C. Since the transistor T*r* is of the pnp-type, the transistor will become blocked. The pulse which is still applied to the collector is thus disconnected from the tunnel diode. As long as the transistor T*r* is in its blocked state, the capacitor C remains to be charged via the resistor R. This charging of the capacitor is delayed until the input pulse at the collector has died away. In this way it is safeguarded that each time only one tunnel diode changes its operating point in response to each of the applied input pulses. If the capacitor C is sufficiently charged, then the transistor T*r* is maintained in the unblocked state, and the arrangement is ready to store a further pulse. The storage capacity of the arrangement is determined by the number of tunnel diodes arranged within the chain. It is not necessary for the peak currents of the tunnel diodes to lie equally within a given range. There will only have to be met the one requirement according to which all currents have to be different, which is practically the case in every randomly selected amount of diodes.

A plot of typical input and output voltages vs. time appears in FIG. 5.

When inserting another resistor R1 and a contact *k* in the main circuit, the series connection between the tunnel diode chain and the transistor path, a pulse generator will be obtained as shown in FIG. 2. This generator transmits a number of pulses corresponding to the number of tunnel diodes upon closure of the contact *k*. The multistable chain is controlled in the same way as the storage device in FIG. 1. The periodic connecting-through of the storage circuit via the transistor T*r* is repeated until all tunnel diodes have assumed the operating point with the high voltage drop. The resetting of the basic circuit is effected in the most simple manner by short-circuiting the chain of tunnel diodes.

When enlarging the basic circuit by employing auxiliary circuits extending via the resistor R2 and the contacts *k*1, *k*2, *k*3, there will result a code converter as shown in FIG. 3. When closing any one of the contacts *k*1 to *k*3, some of the tunnel diodes will already be brought into the state of the high voltage drop. Upon closing the contact *k* the arrangement will operate as a pulse transmitter as shown in FIG. 2. The difference resides in the fact that quite depending on the given circuit condition and via the auxiliary circuits, there will be produced a different number of pulses to be transmitted during the conversion. The arrangement serves to convert the (1-out-of-X)-information, which is supplied via the auxiliary circuits, into an output signal consisting of a corresponding number of pulses. The number of pulses is determined by the number of tunnel diodes which are not reversed by the auxiliary circuits. For example, if 10 tunnel diodes are inserted in the chain, and if already 4 diodes are reversed with the aid of the auxiliary circuit, then 6 pulses will be transmitted by the basic circuit until this circuit reaches the final position in which all tunnel diodes assume the state of the high voltage drop.

Another practical use of the basic circuit is shown in FIG. 4. The series connection consisting of the chain of tunnel diodes and the transistor path, is in such a way capable of being connected together with a measuring circuit *k*, R*k*, that the current flowing through the measuring circut, is also conducted or caused to flow through the chain of tunnel diodes. The transistor T*r* is always blocked again until all tunnel diodes with peak currents smaller than the measuring current, have been changed to the state of the high voltage drop. In this way the measuring current is represented by a corresponding number of pulses. With respect to such a type of analog-to-digital converter it is advisable to distribute the peak currents equally throughout the entire current range of the measuring circuit. The sub-ranges into which the current range is divided, are decisive for the accuracy of the conversion. If the contact *k* remains closed throughout a longer period of time, then a maximum value indicator will be obtained in the most simple manner, which, in a way similar to that shown in FIG. 3, can be read by the chain being stepped-on to the final state. This may be accomplished by arranging a corresponding circuit (R1, *k*, in FIG. 3) parallel in relation to the measuring circuit. The resistance value of the resistor R1 in this circuit is so dimensioned that a current will flow through the chain of tunnel diodes, having a value exceeding that of the greatest peak current of all tunnel diodes.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A basic tunnel diode circuit configuration comprising:
    a chain of series connected tunnel diodes having different peak and valley current characteristics, a source of bias current coupled to said chain, said bias current having an amplitude intermediate the smallest peak current amplitude and the greatest valley current amplitude associated with the tunnel diodes of said chain,
    switching means coupled to said chain for selectively adding pulses of additional current to the bias current flowing from said source into said chain, the sum of the amplitudes of said additional and bias currents exceeding the largest peak current amplitude associated with the tunnel diodes of said chain, and
    control means coupled to said switching means and to said chain of tunnel diodes for rendering said switching means ineffective immediately after one tunnel diode changes its operating point, said control means rendering said switching means ineffective for a predetermined time duration so that only one tunnel diode can change its operating point in response to each input pulse.

2. A basic tunnel diode circuit configuration according to claim 1, wherein:
    said switching means comprises a transistor having emitter and collector electrodes connected in series circuit with said tunnel diode chain and having a base electrode connected to said control means.

3. A basic circuit configuration according to claim 2 wherein:
    said control means comprises an RC network having an associated RC delay characteristic which determines said predetermined time duration.

4. A basic circuit configuration according to claim 3 wherein:
    the said time delay associated with said RC circuit is greater than the duration of pulses applied to said switching means, whereby for each said pulse, one, and only one, of the said tunnel diodes undergoes a reversal in state, the said chain thereby comprising a multistable storage device.

5. A basic circuit configuration according to claim 4 wherein:
    additional switch means are included in series circuit with the collector of said transistor for the purpose of controlling the application of said additional current pulses to said tunnel diode chain.

6. A basic circuit configuration according to claim 5 wherein:
    further switching means are connected to the individual tunnel diodes of said chain for the purpose of controlling the initial stable states thereof prior to the application of said additional current pulses.

7. A tunnel diode circuit according to claim 6 wherein:

a variable resistor is connected in series circuit with said transistor collector and said additional switching means.

References Cited by the Examiner

UNITED STATES PATENTS

| | | | |
|---|---|---|---|
| 3,094,630 | 6/63 | Rapp et al. | 307—88.5 |
| 3,094,631 | 6/63 | Davis | 307—88.5 |

ARTHUR GAUSS, *Primary Examiner.*